US011847363B2

(12) United States Patent
Takemura (10) Patent No.: US 11,847,363 B2
(45) Date of Patent: Dec. 19, 2023

(54) IMAGE FORMING APPARATUS THAT EXECUTES CALIBRATION (71) Applicant: CANON KABUSHIKI KAISHA, Tokyo (JP)

(72) Inventor: Taichi Takemura, Chiba (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 18/142,140

(22) Filed: May 2, 2023

(65) Prior Publication Data

US 2023/0376256 A1 Nov. 23, 2023

(30) Foreign Application Priority Data

May 18, 2022 (JP) .................................. 2022-081723

(51) Int. Cl.
G06F 3/12 (2006.01)
(52) U.S. Cl.
CPC .......... G06F 3/1219 (2013.01); G06F 3/1215 (2013.01); G06F 3/1245 (2013.01)
(58) Field of Classification Search
CPC .............................. G06F 3/1219; G06F 3/1245
See application file for complete search history.

(56) References Cited

U.S. PATENT DOCUMENTS

| 6,178,007 | B1 | 1/2001 | Harrington |
| 6,418,281 | B1 | 7/2002 | Ohki |
| 9,291,933 | B2* | 3/2016 | Hirano ............... G03G 15/5062 |
| 2020/0366812 | A1* | 11/2020 | Hirao ................. H04N 1/00074 |

FOREIGN PATENT DOCUMENTS

| JP | H10-224653 A | 8/1998 |
| JP | 2000-238341 A | 9/2000 |

* cited by examiner

Primary Examiner — King Y Poon
Assistant Examiner — Michael L Burleson
(74) Attorney, Agent, or Firm — VENABLE LLP (57) ABSTRACT An image forming apparatus includes a conversion unit to convert image data based on a conversion condition, an image forming unit to form an image based on an image data converted by the conversion unit, and a control unit to execute first calibration in which both a first conversion condition for a first speed and a second conversion condition for a second speed are generated based on a detection result of a first pattern that is formed at the first speed, with the first calibration being executed at initial installation of the apparatus, and execute second calibration in which the second conversion condition is generated based on a detection result of a second pattern that is formed at the second speed, with the second calibration being not executed at the initial installation of the apparatus.

8 Claims, 9 Drawing Sheets

| HUMIDITY | TEMPERATURE | | |
|---|---|---|---|
| | LESS THAN 23°C | 23°C OR MORE AND LESS THAN 28°C | LESS THAN 28°C |
| LESS THAN 15% | 1.04 | 1.03 | 1.01 |
| 15% OR MORE AND LESS THAN 50% | 1.01 | 1.00 | 0.99 |
| MORE THAN 50% | 0.99 | 0.96 | 0.94 |

IMAGE FORMING APPARATUS THAT EXECUTES CALIBRATION

BACKGROUND OF THE INVENTION

Field of the Invention

The present disclosure relates to a calibration technique in an image forming apparatus.

Description of the Related Art

The density (tone) of an image formed by an image forming apparatus can change due to a change in an environment, a change over time, and so forth. In order to bring the density of an image to be formed close to a target density, the image forming apparatus executes density calibration (hereinafter simply referred to as calibration). U.S. Pat. No. 6,418,281 discloses a configuration that generates an image forming condition for controlling the image density by reading a tone pattern formed on a recording material. U.S. Pat. No. 6,178,007 discloses a configuration that forms a color patch at a regular interval while performing image formation based on a job, and determines an image forming condition based on the result of detection of the color patches.

Calibration needs to be performed for each type of image formation. Specifically, an image forming apparatus performs image formation at an image forming speed corresponding to the type of a recording material. Here, an image forming condition (a conversion condition) obtained in calibration performed at a first image forming speed can be used in image formation at the first image forming speed, but may not be usable in image formation at a second image forming speed different from the first image forming speed. Similarly, an image forming condition (a conversion condition) obtained in calibration that uses halftone processing of a first type can be used in image formation that uses the halftone processing of the first type, but may not be usable in image formation that uses halftone processing of a second type different from the first type. Furthermore, an image forming condition (a conversion condition) obtained in calibration performed at a first resolution can be used in image formation at the first resolution, but may not be usable in image formation at a second resolution different from the first resolution.

In this way, the types of image formation are distinguished based on, for example, the image forming speed, resolution, halftone processing, and the like of image formation, and are hereinafter referenced also as "image forming modes". In a case where an image forming apparatus has a plurality of image forming modes, the image forming apparatus requires an image forming condition (a conversion condition) for each image forming mode. For example, at the time of initial installation of the image forming apparatus and the like, it is typical to generate an image forming condition (a conversion condition) for each of the plurality of image forming modes. Therefore, if calibration is performed in each of the plurality of image forming modes, a time period required for calibration is extended.

SUMMARY OF THE INVENTION

According to an aspect of the present disclosure, an image forming apparatus includes: a conversion unit configured to convert image data based on a conversion condition; an image forming unit configured to form an image on a recording material based on the image data converted by the conversion unit; a first detection unit configured to detect the image formed on the recording material by the image forming unit; and a control unit configured to: execute first calibration in which both a first conversion condition for a first image forming speed and a second conversion condition for a second image forming speed different from the first image forming speed are generated based on a detection result of a first test pattern by the first detection unit, the first test pattern being formed by the image forming unit at the first image forming speed, the first calibration being executed at initial installation of the image forming apparatus; and execute second calibration in which the second conversion condition for the second image forming speed is generated based on a detection result of a second test pattern by the first detection unit, the second test pattern being formed by the image forming unit at the second image forming speed, the second calibration being not executed at the initial installation of the image forming apparatus.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

Note that the following describes each embodiment based on an image forming apparatus of an electrophotographic type. However, the contents of the present disclosure are also applicable to image forming apparatuses of other types, such as an inkjet type and a dye-sublimation type.

First Embodiment

Figure 1:
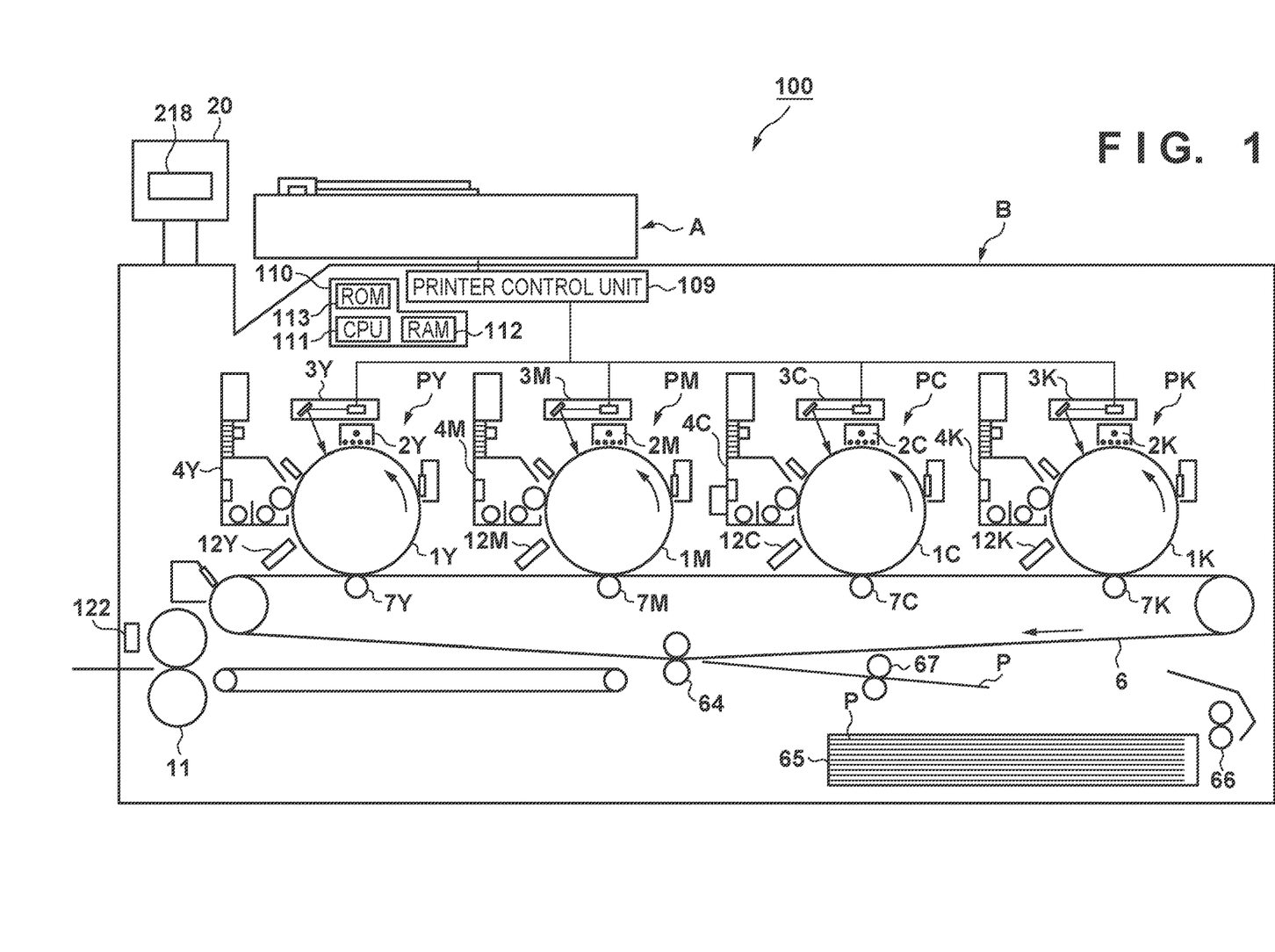
FIG. 1 is a schematic cross-sectional diagram of an image forming apparatus according to an embodiment.

FIG. 1 is a schematic cross-sectional diagram of an image forming apparatus 100. The image forming apparatus 100 includes a printer unit B and an image reading unit A. The image reading unit A reads an image of a document, and outputs image data indicating the image of the document to a printer control unit 109 of the printer unit B. The printer unit B forms an image on a recording material P based on image data from the image reading unit A, or on image data received from an external apparatus via a non-illustrated network. The following describes a configuration of the printer unit B.

Image forming units PY, PM, PC, and PK form toner images in yellow, magenta, cyan, and black, respectively, and transfer the toner images to an intermediate transfer belt 6. Although the image forming units PY, PM, PC, and PK use toner of different colors in image formation, they have similar configurations. In FIG. 1, the letters "Y", "M", "C", and "K" are respectively appended at the ends of the reference signs indicating the members that compose the image forming units PY, PM, PC, and PK. Note that in the following description, in a case where the colors need not be distinguished, the reference signs are used with omission of the letters "Y", "M", "C", and "K" from the ends of the reference signs.

A photosensitive member 1 is an image carrier, and is driven to rotate in a counterclockwise direction in the figure at the time of image formation. A charging apparatus 2 causes a surface of the photosensitive member 1 to be charged at a uniform potential. An exposure apparatus 3 exposes the photosensitive member 1 to light based on an image signal from the printer control unit 109, thereby forming an electrostatic latent image on the photosensitive member 1. A development apparatus 4 causes toner to attach to the electrostatic latent image on the photosensitive member 1 by outputting a development voltage, thereby forming a toner image on the photosensitive member 1. A primary transfer roller 7 transfers the toner image on the photosensitive member 1 to the intermediate transfer belt 6 by outputting a primary transfer voltage. Various colors can be produced by transferring the toner images on the respective photosensitive members 1 to the intermediate transfer belt 6 in such a manner that the toner images overlap one another.

The intermediate transfer belt 6 is an image carrier, and is driven to rotate in a clockwise direction in the figure at the time of image formation. As a result, the toner images on the intermediate transfer belt 6 are conveyed to a position that opposes a secondary transfer roller 64. Meanwhile, a recording material (sheet) P stored in a cassette 65 is conveyed to the position that opposes the secondary transfer roller 64 by a roller 66 and a roller 67. The secondary transfer roller 64 transfers the toner images on the intermediate transfer belt 6 to the recording material P by outputting a secondary transfer voltage. The recording material P to which the toner images have been transferred is conveyed to a fixing apparatus 11. The fixing apparatus 11 fixes the toner images on the recording material P by applying heat and pressure to the recording material P. After the toner images have been fixed, the recording material P is discharged to the outside of the image forming apparatus 100.

A control unit 110 integrally controls an image forming operation of the image forming apparatus 100. The control unit 110 includes a CPU 111, a RAM 112, and a ROM 113.

The ROM 113 is a nonvolatile memory, and stores, for example, a control program and various types of data that are used in image formation. Note that the ROM 113 may be a rewritable nonvolatile memory. The CPU 111 controls the image forming operation by executing the control program stored in the ROM 113. Note that, at this time, the CPU 111 uses various types of data stored in the ROM 113, and also uses the RAM 112 as a working area. The control unit 110 generates and updates tone correction tables (LUTs), which represent image forming conditions (conversion conditions), by executing later-described calibration. Then, the printer control unit 109 applies tone correction to image data received from the image reading unit A or an external apparatus using the LUTs, and performs image formation by outputting an image signal based on the image data after the tone correction to the exposure apparatus 3. The printer control unit 109 functions as a conversion unit that converts image data based on tone correction tables corresponding to an image forming speed. Note that the printer control unit 109 may be an image processor that executes image processing for converting image data based on tone correction tables corresponding to an image forming speed.

An operation unit 20 includes a touch display 218, and provides a user interface. A user can operate the image forming apparatus 100 by inputting a user input to the image forming apparatus 100 via the touch display 218. That is to say, the operation unit 20 functions as an acceptance unit for a user input from the user. Furthermore, the user can determine a state of the image forming apparatus 100 based on a screen displayed on the touch display 218.

The printer unit B can include a sensor 122 that detects the density of toner images that have been fixed by the fixing apparatus 11. The CPU 111 can detect the density of toner images formed on a recording material P based on the detection result from the sensor 122. Furthermore, each of the image forming units PY, PM, PC, and PK includes a density sensor 12 that detects the density of a toner image formed on the photosensitive member 1. The density sensor 12 includes a light emitting element such as an LED, and a light receiving element such as a photodiode (PD). The light receiving element is placed so as to receive light that has been emitted by the light emitting element and specularly reflected by the photosensitive member 1. The density sensor 12 outputs a signal indicating an amount of light received by the light receiving element to the CPU 111.

Figure 2:
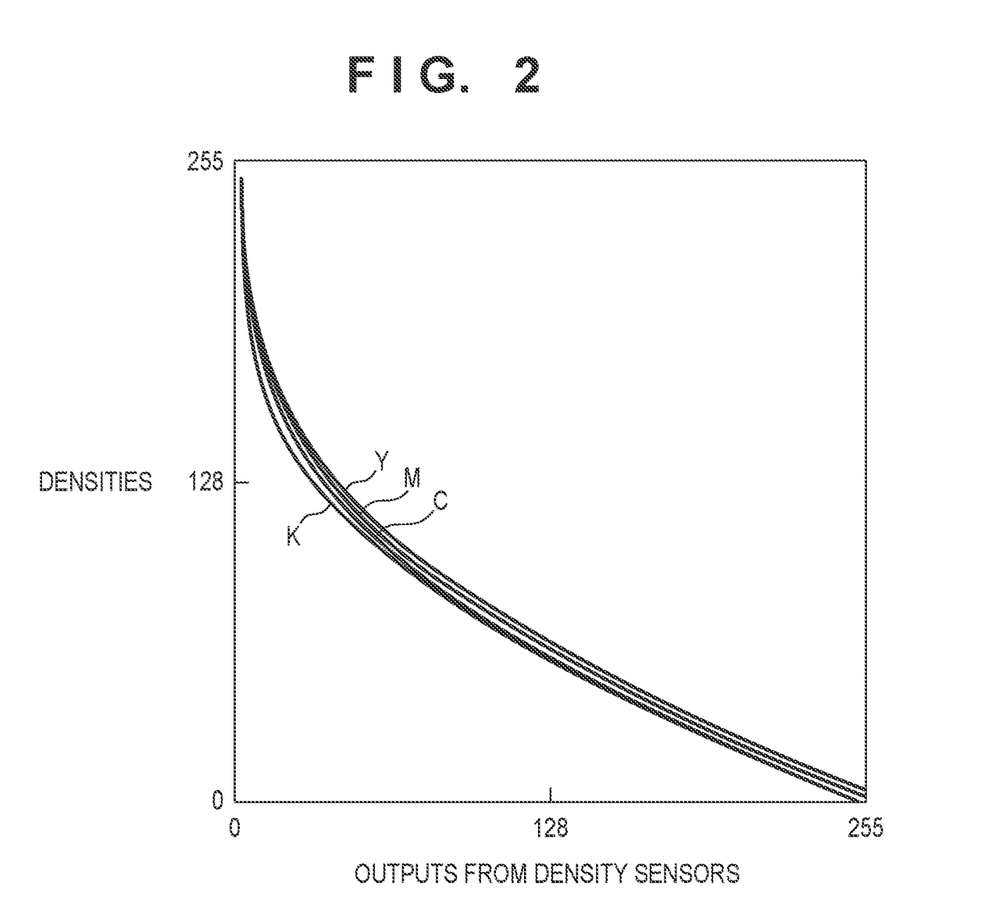
FIG. 2 is a diagram showing an exemplary relationship between outputs from density sensors and densities.

FIG. 2 shows a relationship between the densities of toner images formed on the photosensitive members 1 and the outputs from the density sensors 12. With respect to each color, the control unit 110 stores information indicating a relationship between the density of a toner image on the photosensitive member 1 and an output from the density sensor 12, which is shown in FIG. 2. Therefore, the CPU 111 can determine the densities of toner images formed on the photosensitive members 1 based on the outputs from the density sensors 12.

Figure 3:
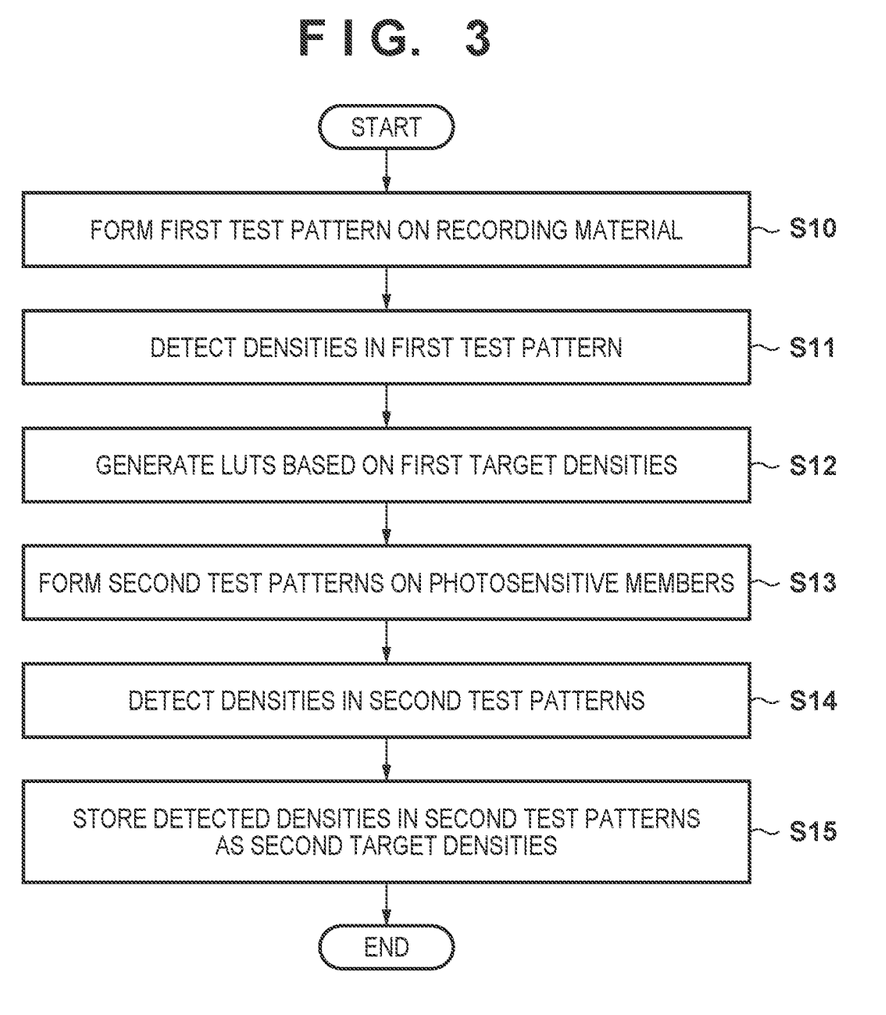
FIG. 3 is a flowchart of first-type calibration according to an embodiment.

As stated earlier, the image forming apparatus 100 executes calibration so as to bring the density of an image to be formed close to a target density. In the present embodiment, calibration is classified into first-type calibration and second-type calibration. The first-type calibration is calibration that is performed by forming test patterns on a recording material P and detecting the test patterns formed on the recording material P using the sensor 122 or the image reading unit A. The second-type calibration is calibration that is performed by forming test patterns on the photosensitive members 1 and detecting the test patterns formed on the photosensitive members 1 using the density sensors 12. FIG. 3 is a flowchart of the first-type calibration.

When the user has issued, for example, an instruction for the execution of the first-type calibration via the operation unit 20, the control unit 110 forms a first test pattern on a recording material P in step S10. The first test pattern includes, for each color, patch images of a plurality of tones. As one example, the first test pattern includes, for each color, patch images of 64 different tones. In step S11, the control unit 110 detects the densities of the respective patch images in the first test pattern formed on the recording material P. For example, the densities of the respective patch images in the first test pattern are detected by the image reading unit A reading each patch image in the first test pattern. In this case, the user sets, on the image reading unit A, the recording material P which has been output from the image forming apparatus 100 and on which the first test pattern has been formed, and instructs the image forming apparatus 100 to read this recording material P via the operation unit 20. Furthermore, for example, the densities of the respective patch images in the first test pattern can be detected by the sensor 122. In this case, the image forming apparatus 100 detects the densities of the respective patch images in the first test pattern at the downstream side relative to the fixing apparatus 11.

Figure 4:
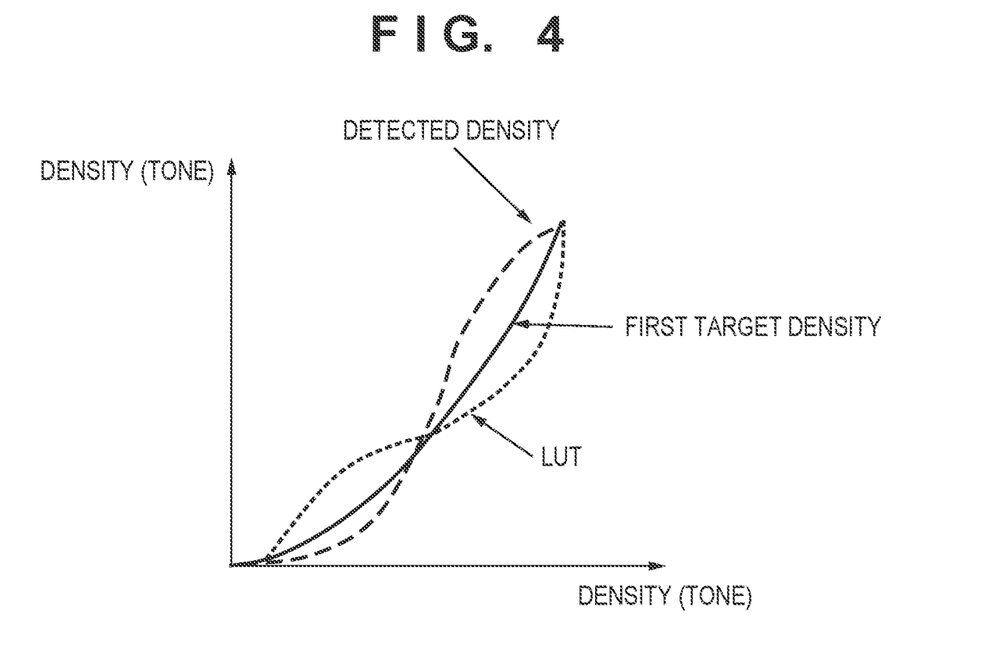
FIG. 4 is a diagram showing an exemplary relationship among a detected density, a first target density, and a tone correction table.

In step S12, the control unit 110 generates LUTs for the respective colors based on the tone values and the detected densities of the respective patch images, and on first target densities corresponding to the tone values of the respective patch images. Note that the first target densities are stored in the control unit 110 in advance. FIG. 4 shows a relationship among a detected density, a first target density, and a generated LUT. LUTs are used to obtain the tone values (output tone values) used in image formation by converting the tone values (input tone values) indicated by image data received from the image reading unit A or an external apparatus at the time of image formation. By converting the tone values indicated by image data with use of LUTs, the densities of images to be formed on the recording material P can be brought close to the first target densities.

Subsequently, in steps S13 to S15, the control unit 110 executes processing for deciding on second target densities in the second-type calibration. First, the control unit 110 forms second test patterns on the respective photosensitive members 1 using a plurality of different, predetermined tone values in step S13. In the present example, it is assumed that the control unit 110 forms the second test patterns on the respective photosensitive members 1 using five different tone values. In forming the second test patterns in step S13, the control unit 110 uses the LUTs generated in step S12. That is to say, the control unit 110 converts the five predetermined tone values using a LUT, and forms a second test pattern including five patch images on each photosensitive member 1 based on the five tone values that have been converted. In step S14, the control unit 110 uses each density sensor 12 to detect the density of each patch image in the second test patterns that have been formed on the respective photosensitive members 1.

Patch images of the first target densities are obtained by transferring and fixing the patch images in the second test patterns onto a recording material P. Therefore, the densities of the second test patterns that are detected by the density sensors 12 in step S14 are the densities on the photosensitive members 1 with which the densities on the recording material P become the first target densities. Thus, in step S15, the control unit 110 stores, into the RAM 112 for example, the densities of the patch images detected in step S14 as the second target densities of the tone values (before conversion using the LUTs) used in forming these patch images.

Figure 5:
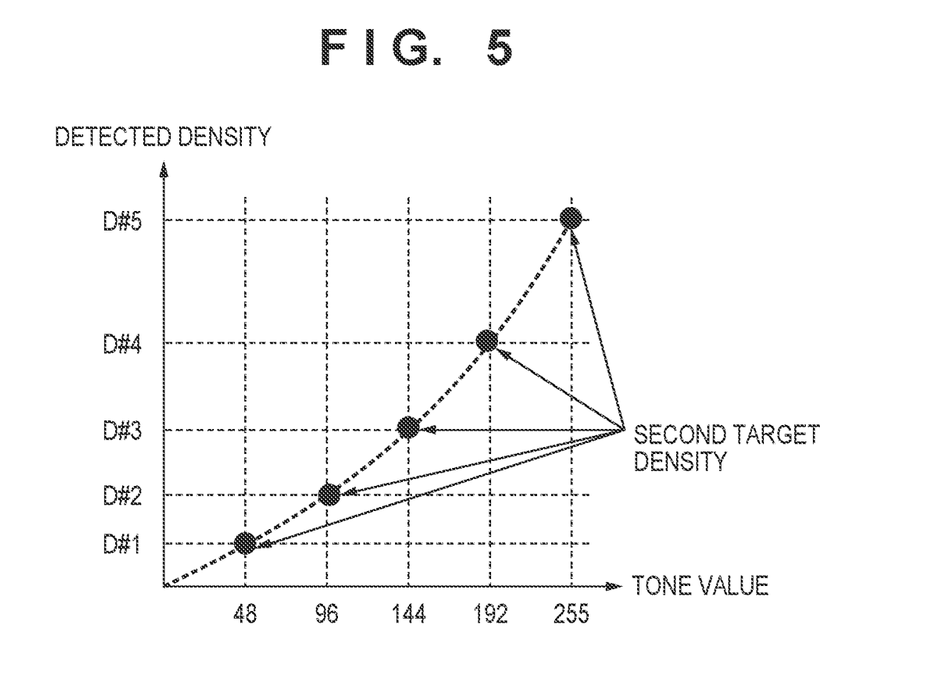
FIG. 5 is a diagram for describing a method of determining second target densities according to an embodiment.

FIG. 5 shows a specific example of processing of steps S13 to S15. In FIG. 5, the second test patterns including five patch images are formed on the photosensitive members 1 using five tone values 48, 96, 144, 192, and 255. The densities detected by the density sensors 12 from the patch images formed with the tone values 48, 96, 144, 192, and 255 are D #1, D #2, D #3, D #4, and D #5, respectively. In this case, the second target densities of images formed on the photosensitive members 1 with the tone values 48, 96, 144, 192, and 255 are D #1, D #2, D #3, D #4, and D #5, respectively.

Thereafter, if a predetermined condition has been satisfied, the image forming apparatus 100 executes the second-type calibration. Specifically, the second test patterns are formed on the respective photosensitive members 1, and the densities of the respective patch images in the second test patterns are detected by the density sensors 12. Then, the LUTs are corrected so as to bring the densities of the respective patch images in the second test patterns close to the second target densities. In this way, in the first-type calibration, the LUTs are generated, and in addition, the second target densities in the second-type calibration are decided on. Then, the LUTs are updated in the second-type calibration. As a result, the densities of images formed on a recording material P can be brought close to the first target densities.

However, as stated earlier, the LUTs need to be generated for each image forming mode. For example, the image forming apparatus 100 causes the image forming speed (the conveyance speed of a recording material P, the rotation speed of the photosensitive members 1, and the like) to vary depending on the type of a recording material P on which images are to be formed. Therefore, in a case where the image forming apparatus 100 uses a plurality of image forming speeds for different types of recording materials P, it is necessary to generate LUTs that are associated with different image forming speeds. Similarly, in a case where the image forming apparatus 100 uses a plurality of different resolutions for different cases, it is necessary to generate LUTs that are associated with different resolutions. Moreover, in a case where the image forming apparatus 100 uses a plurality of different types of halftone processing for different cases, it is necessary to generate LUTs that are associated with different types of halftone processing.

In view of this, in the present embodiment, the first-type calibration has two modes: a first mode and a second mode. In the second mode, the user designates an image forming mode in which LUTs are to be generated. On the other hand, in the first mode, calibration is executed in one predetermined image forming mode included among a plurality of image forming modes, and the user does not designate an image forming mode. Hereinafter, in order to simplify terms, the first-type calibration performed in the first mode is also referred to as "first calibration", and the first-type calibration performed in the second mode is also referred to as "second calibration".

Below, the embodiment is described as a specific example that does not limit the invention, under the assumption that the image forming modes are distinguished based on the image forming speed, and the image forming apparatus 100 has two image forming speeds: a standard speed and a low speed. Note, it is assumed that the standard speed is used for a recording material P of a first type, and the low speed is used for a recording material P of a second type. Also, hereinafter, in order to simplify terms, a recording material P of the first type is referred to as "standard paper", and a recording material P of the second type is referred to as "thick paper".

<Second Calibration>

Figure 6:
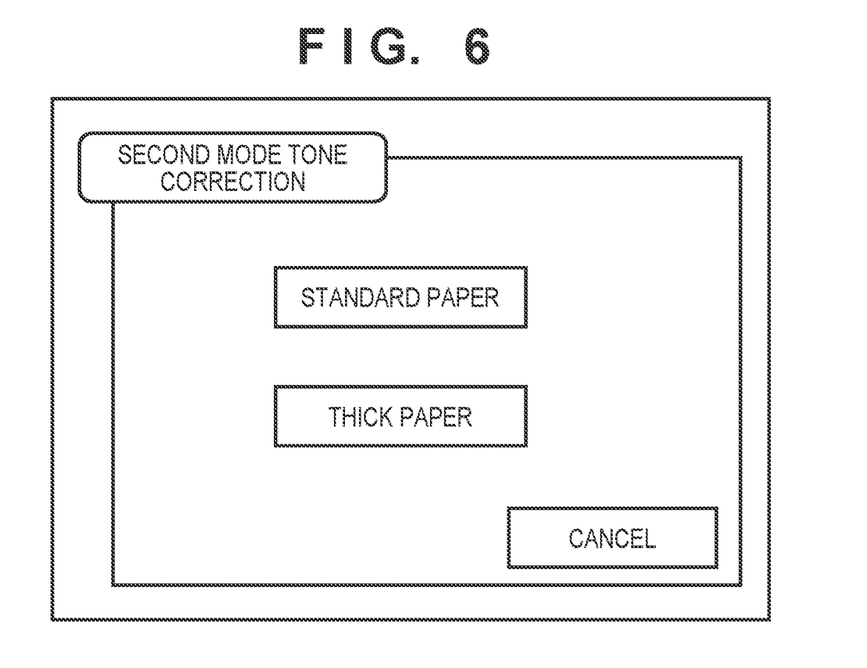
FIG. 6 is a diagram showing an example of a screen that is displayed when second calibration is executed.
Figure 7A:
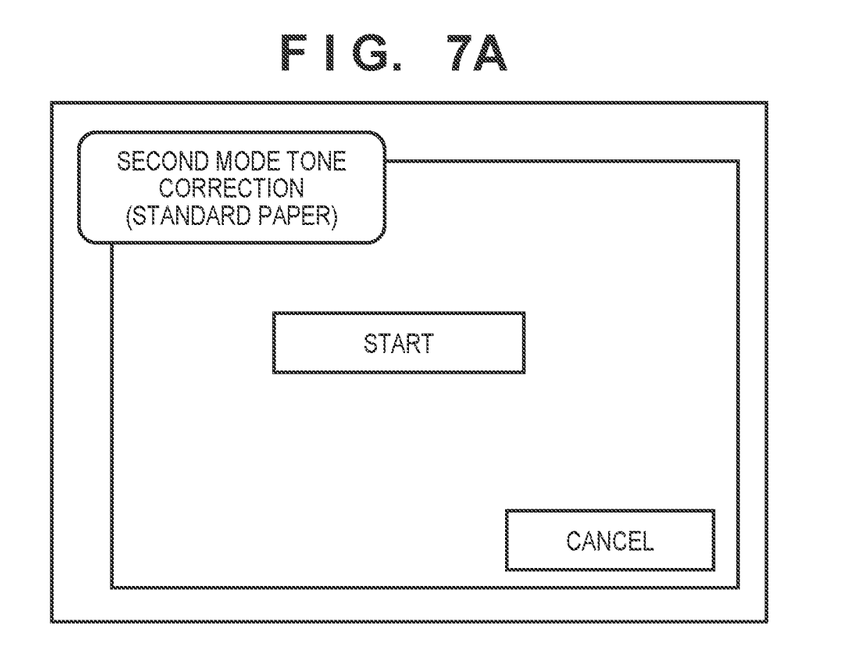
FIG. 7A and FIG. 7B are diagrams showing examples of screens that are displayed when second calibration is executed.

For example, when the user has issued an instruction for the execution of the second calibration via the operation unit 20, the control unit 110 displays a screen shown in FIG. 6 on the touch display 218 of the operation unit 20. Based on the screen shown in FIG. 6, the user selects standard paper or thick paper as a recording material P to be used in the second calibration. This is equivalent to designation of an image forming mode for the second calibration. For example, if the user selects standard paper, the control unit 110 displays a screen shown in FIG. 7A on the touch display 218. If the user presses a "start" button on the screen of FIG. 7A, the control unit 110 executes the second calibration at the standard speed in accordance with the flowchart of FIG. 3. That is to say, the control unit 110 forms LUTs for the standard speed by forming the first test pattern on standard paper, and also decides on the second target densities at the standard speed.

Figure 7B:
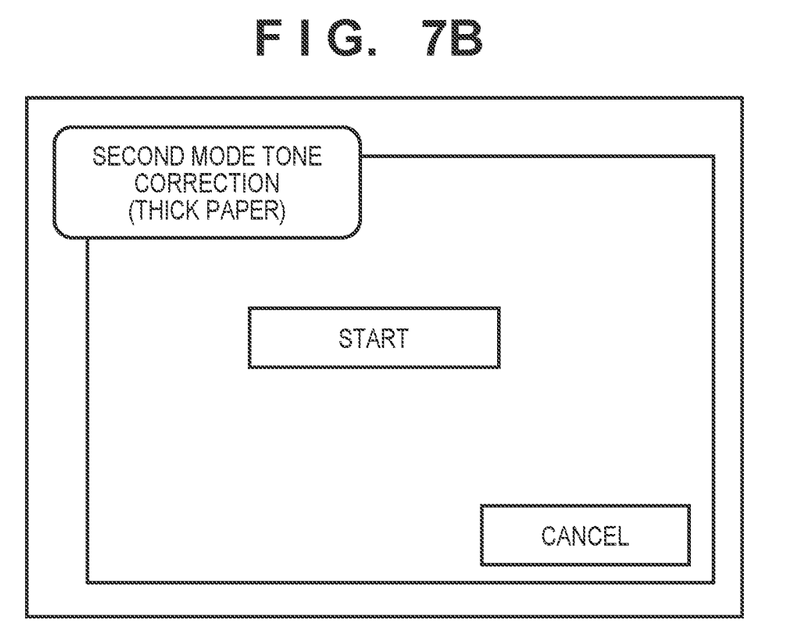

On the other hand, if the user selects thick paper on the screen of FIG. 6, the control unit 110 displays a screen shown in FIG. 7B on the touch display 218. If the user presses a "start" button on the screen of FIG. 7B, the control unit 110 executes the second calibration at the low speed in accordance with the flowchart of FIG. 3. That is to say, the control unit 110 forms LUTs for the low speed by forming the first test pattern on standard paper, and also decides on the second target densities at the low speed. Note that the first target densities are the same regardless of the image forming mode (the standard speed or the low speed).

<First Calibration>

In the first calibration, the first-type calibration is executed in a predetermined image forming mode, LUTs associated with this image forming mode are generated, and furthermore, the second target densities in this image forming mode are decided on. Then, based on the LUTs associated with the predetermined image forming mode, the LUTs and the second target densities that are associated with other image forming modes are determined. The following describes the first calibration under the assumption that the predetermined image forming mode is the standard speed corresponding to standard paper. When the user has issued an instruction for the execution of the first calibration via the operation unit 20, the control unit 110 displays a screen shown in FIG. 8 on the touch display 218 of the operation unit 20. If the user presses a "start" button on the screen shown in FIG. 8, the control unit 110 executes the first calibration in accordance with a flowchart of FIG. 9.

Figure 9:
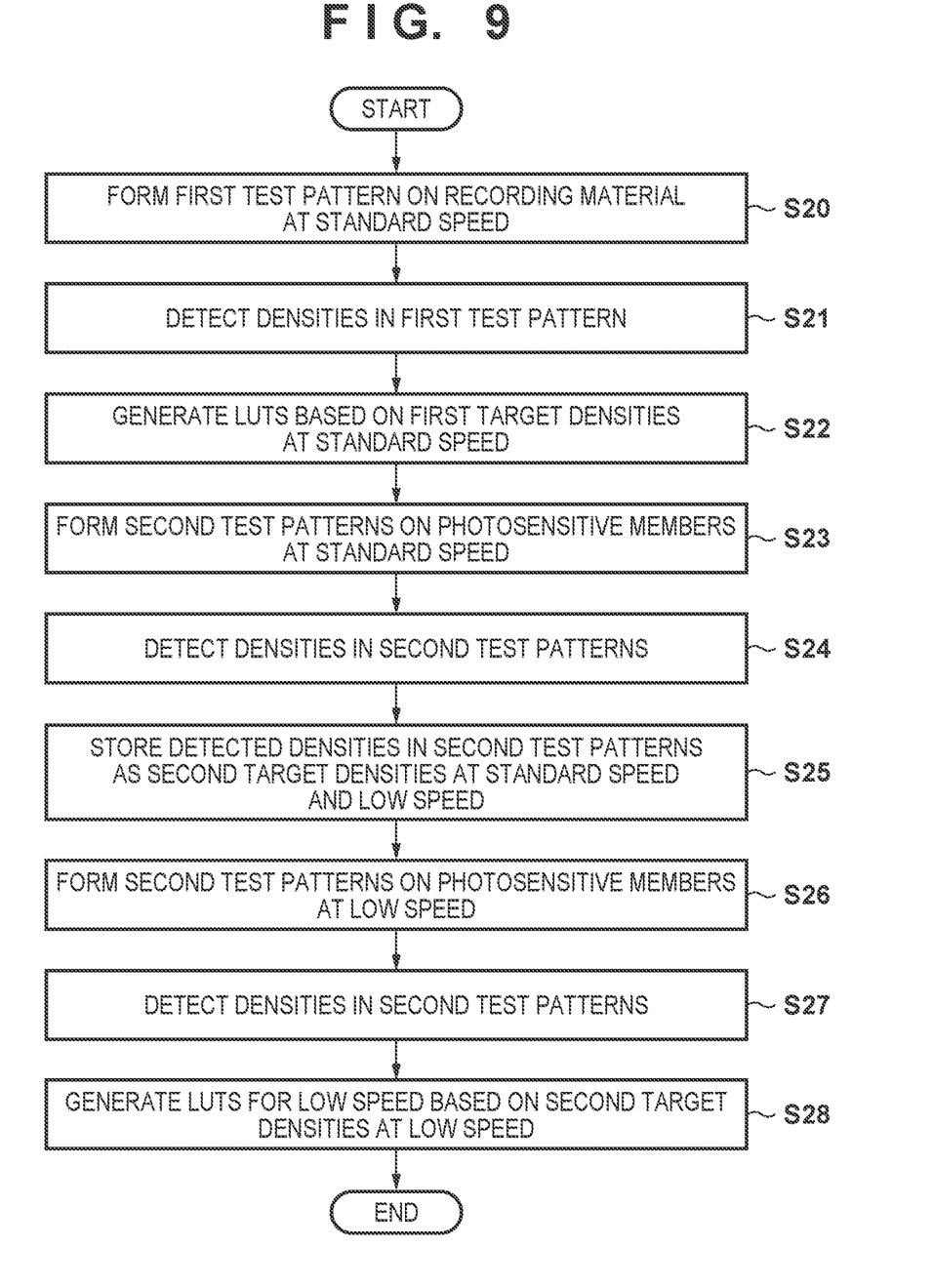
FIG. 9 is a flowchart of first calibration according to an embodiment.

Processing of steps S20 to S24 in FIG. 9 is similar to processing of steps S10 to S14 in FIG. 3 that is performed using standard paper. In step S25, the control unit 110 stores, into the RAM 112 for example, the densities of the respective patch images in the second test patterns detected in step S24 as the second target densities at the standard speed and the second target densities at the low speed (target values). Even if the densities on the photosensitive members 1 are the same, the tendencies of the densities on recording materials P differ depending on the image forming speed; however, as the difference therein is not large, the densities detected in step S24 are treated as the second target densities in all image forming modes in the present embodiment.

Subsequently, the control unit 110 forms the second test patterns on the photosensitive members 1 at the low speed in step S26, and detects the densities of the respective patch images in the second test patterns using the density sensors 12 in step S27. Subsequently, in step S28, the control unit 110 generates LUTs for the low speed based on the second target densities at the low speed (determined in step S25), and on the detected densities of the respective patch images in the second test patterns formed on the photosensitive members 1 at the low speed (detected in step S27).

In this way, by executing calibration in one image forming mode included among a plurality of image forming modes, not only LUTs for this one image forming mode but also LUTs for one or more other image forming modes can be generated, and in addition, the second target densities can be determined. Therefore, a time period required for calibration can be shortened.

For example, at the time of initial installation of the image forming apparatus 100, it is necessary to generate LUTs for each image forming mode in order for image formation to be performed later. Here, if the image forming apparatus 100 can execute only the second mode (the second calibration), the first-type calibration needs to be executed with respect to each of the plurality of image forming modes, thereby increasing the workload of the installation task. Furthermore, in a case where the image forming modes are associated with the types of recording materials P as in the above-described embodiment, it is necessary to prepare recording materials P associated with the image forming modes (standard paper and thick paper in the above-described embodiment). On the other hand, the image forming apparatus 100 according to the present embodiment is configured to be capable of executing the first mode (the first calibration). Therefore, by executing calibration in one image forming mode, LUTs for all image forming modes can be generated, and the workload at the time of initial installation can be reduced. In addition, it is not necessary to prepare all of the types of recording materials P associated with the image forming modes in advance.

Figure 8:
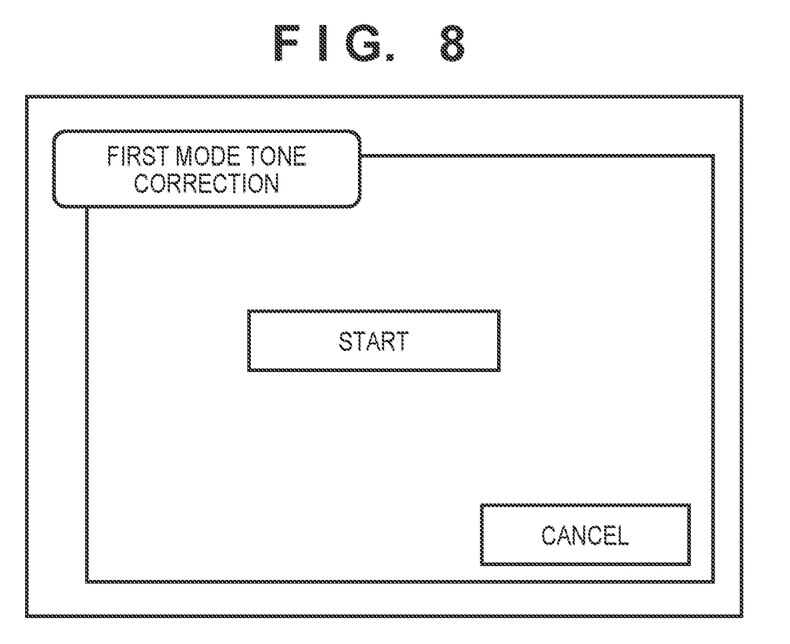
FIG. 8 is a diagram showing an example of a screen that is displayed when first calibration is executed.

Here, in the present embodiment, the operation unit 20 is configured to accept each of a user input (user instruction information) for executing the first calibration, and a user input (user instruction information) for executing the second calibration. However, the control unit 110 can configure the operation unit 20 so that, when a predetermined condition at the time of initial installation and the like has been satisfied, the user instruction information for issuing an instruction for executing the first calibration is accepted, without accepting the user instruction information for issuing an instruction for executing the second calibration. That is to say, in a case where this predetermined condition has been satisfied, the control unit 110 of the image forming apparatus 100 can be configured so that the screen of FIG. 8 is displayed, but the screen of FIG. 6 is not displayed on the operation unit 20. Note that it is possible to adopt a configuration in which the predetermined condition is satisfied in a case where the first calibration has not been executed yet. Furthermore, it is possible to adopt a configuration in which the predetermined condition is satisfied in a case where LUTs associated with each image forming mode are not stored in the control unit 110. To describe this using an example of the above-described embodiment, it is possible to adopt a configuration in which the predetermined condition is satisfied in a case where LUTs associated with the standard speed and the low speed are not stored in the control unit 110.

In addition, the operation unit 20 can be configured to accept a user input for executing the first-type calibration without distinguishing the first calibration and the second calibration. In this case, the control unit 110 executes the first calibration in response to a user input in a case where the aforementioned predetermined condition has been satisfied. On the other hand, in a case where the aforementioned predetermined condition has not been satisfied, the control unit 110 displays a screen for a user input that designates an image forming mode (FIG. 6) on the operation unit 20 in response to a user input, and suggests the user to designate an image forming mode.

<Modifications>

Figure 10:
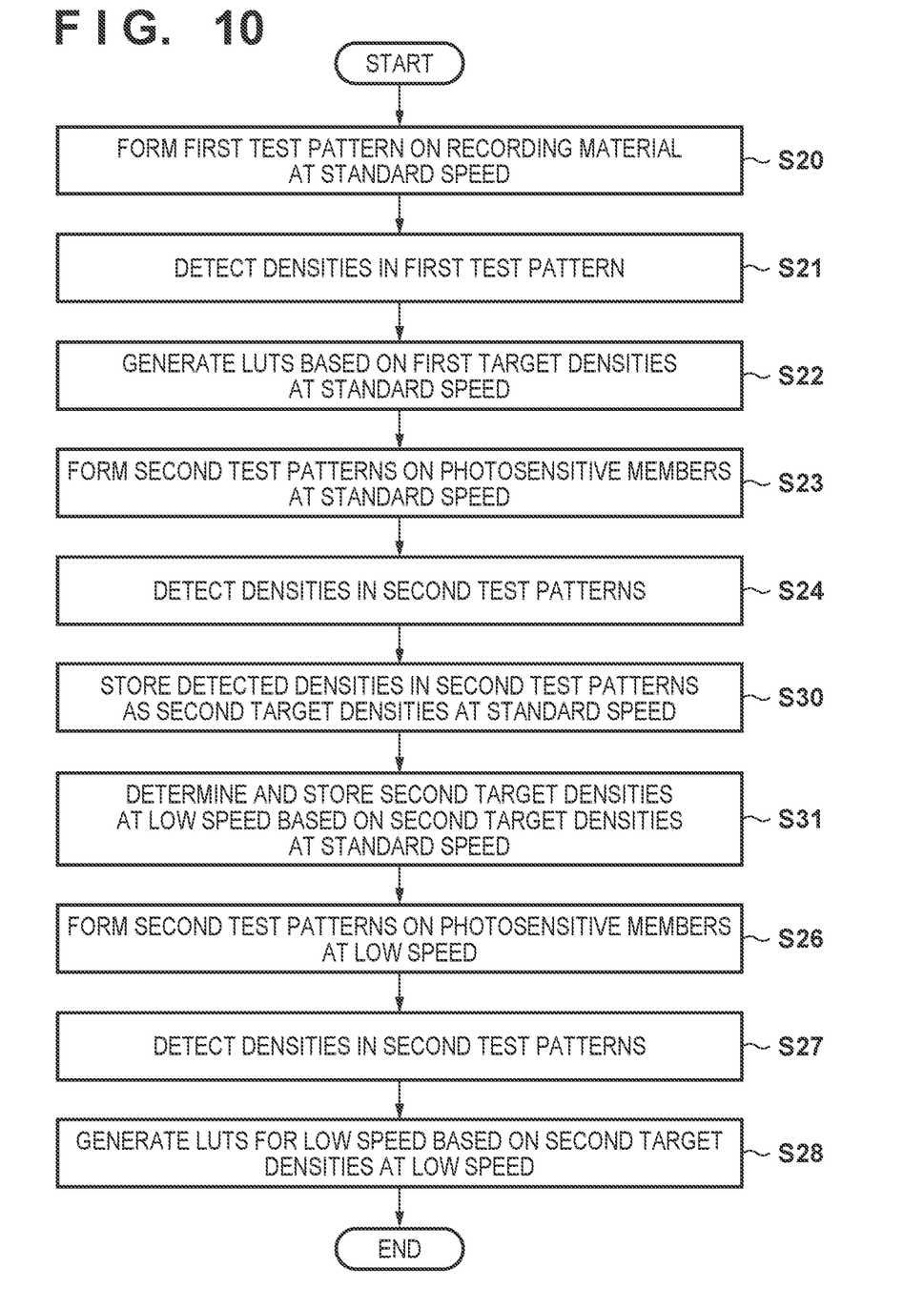
FIG. 10 is a flowchart of first calibration according to an embodiment.

In the flowchart shown in FIG. 9, the densities detected in step S24 are used as the second target densities in each of the plurality of image forming modes. However, it is possible to adopt a configuration in which the densities detected in step S24 are used as the second target densities at the standard speed, and the second target densities at other image forming modes, such as the low speed, are estimated and determined based on the densities detected in step S24. FIG. 10 shows a modification of the flowchart of FIG. 9. Note that processing steps that are similar to processing steps in the flowchart of FIG. 9 are given the same step numbers there as, and a description thereof is omitted.

Figure 11:
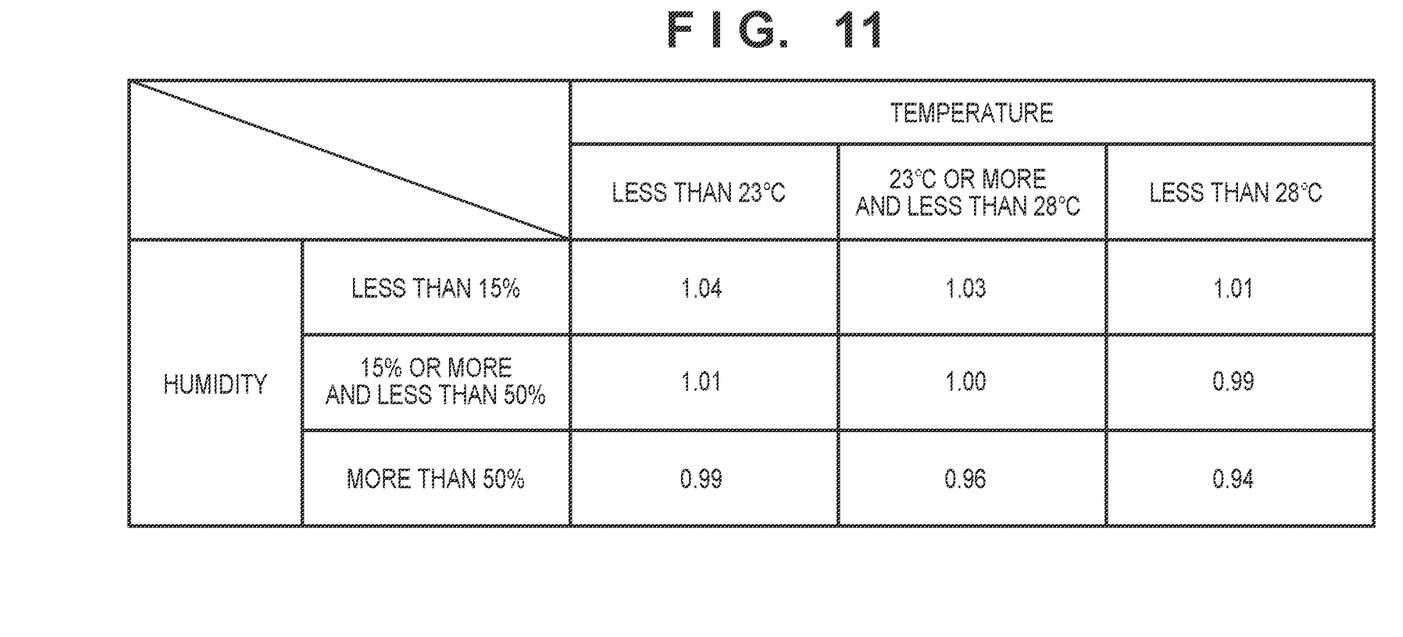
FIG. 11 is a diagram showing information of a coefficient that is used in determination of second target densities according to an embodiment.

Once the control unit 110 has detected the densities of the respective patch images in the second test patterns formed at the standard speed in step S24, it stores the densities detected in step S24 as the second target densities at the standard speed in step S30. Subsequently, in step S31, the control unit 110 determines and stores the second target densities at the low speed based on the second target densities at the standard speed. As one example, the control unit 110 obtains the second target densities at the low speed by adjusting each of the second target densities at the standard speed based on a conversion coefficient that has been stored in advance. In the present modification, it is assumed that the control unit 110 obtains the second target densities at the low speed by multiplying the second target densities at the standard speed by the conversion coefficient. The conversion coefficient may be a predetermined value, but can be, for example, a value that varies with each condition as shown in FIG. 11. In FIG. 11, the value of the conversion coefficient varies based on a combination of the temperature and the humidity that are measured and detected by a thermometer and a hygrometer provided in the image forming apparatus 100, which are not illustrated. For example, according to FIG. 11, in a case where the temperature is 25 degrees and the humidity is 10%, the conversion coefficient is 1.03. Therefore, in this case, the densities obtained by multiplying the second target densities at the standard speed by 1.03 are used as the second target densities at the low speed. Information of the conversion coefficient shown in FIG. 11 is stored in the control unit 110 in advance. Note that although the conversion coefficient is determined based on a combination of the temperature and the humidity in FIG. 11, it is also possible to adopt a configuration in which the conversion coefficient is determined based only on one of the temperature and the humidity. Furthermore, although the same conversion coefficient is used regardless of the tone value in FIG. 11, it is also possible to adopt a configuration in which the conversion coefficient varies depending on the tone value.

Even if the densities on the photosensitive members 1 are the same, the densities of images formed on recording materials P can differ for different image forming speeds (or types of recording materials P). As stated earlier, although the difference in the densities of images formed on recording materials P is small, in a case where there is a regularity in the relationship between the densities on the photosensitive members 1 and the densities on recording materials P, the second target densities at the low speed can be determined with high accuracy by using a conversion coefficient based on this regularity. Therefore, LUTs for an image forming mode different from an image forming mode used in the first calibration can be generated with high accuracy.

<Others>

Note that in each of the above-described embodiments, it is assumed that LUTs are generated for each image forming speed, and the image forming speed is decided on based on the type of a recording material P. For example, in a case where the image forming apparatus 100 uses a first image forming speed for three types of recording materials P, and uses a second image forming speed for two other types of recording materials P, the LUTs for the first image forming speed and the LUTs for the second image forming speed are generated. However, it is possible to adopt a configuration in which the LUTs are generated for each of the types of recording materials P regardless of the image forming speed. That is to say, it is also possible to adopt a configuration in which the image forming modes are distinguished based on the type of a recording material P on which images are to be formed, instead of being distinguished based on the image forming speed.

Furthermore, it is possible to adopt a configuration in which the image forming modes are distinguished based on a combination of two or more of the image forming speed, the resolution, halftone processing, and the type of a recording material P. For example, in a case where two image forming speeds, namely the low speed and the standard speed, and two resolutions, namely low resolution and high resolution, are used, the number of image forming modes can be four.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-081723, filed May 18, 2022, which is hereby incorporated by reference herein in its entirety.

What is claimed is:

1. An image forming apparatus, comprising:
   a conversion unit configured to convert image data based on a conversion condition;
   an image forming unit configured to form an image on a recording material based on the image data converted by the conversion unit;
   a first detection unit configured to detect the image formed on the recording material by the image forming unit; and
   a control unit configured to:
      execute first calibration in which both a first conversion condition for a first image forming speed and a second conversion condition for a second image forming speed different from the first image forming speed are generated based on a detection result of a first test pattern by the first detection unit, the first test pattern being formed by the image forming unit at the first image forming speed, the first calibration being executed at initial installation of the image forming apparatus; and
      execute second calibration in which the second conversion condition for the second image forming speed is generated based on a detection result of a second test pattern by the first detection unit, the second test pattern being formed by the image forming unit at the second image forming speed, the second calibration being not executed at the initial installation of the image forming apparatus.

2. The image forming apparatus according to claim 1 further comprising:
   an acceptance unit configured to accept user instruction information for instructing execution of calibration,
   wherein in a case where the first calibration has not been executed yet, the acceptance unit does not accept the user instruction information for instructing execution of the second calibration, but accepts the user instruction information for instructing execution of the first calibration.

3. The image forming apparatus according to claim 1 further comprising:
   an acceptance unit configured to accept user instruction information for instructing execution of calibration; and
   wherein in a case where the second conversion condition has not been generated yet, the acceptance unit does not accept the user instruction information for instructing execution of the second calibration, but accepts the user instruction information for instructing execution of the first calibration.

4. The image forming apparatus according to claim 1, wherein
   the conversion condition is a tone correction table for converting a tone value indicated by the image data.

5. The image forming apparatus according to claim 1, wherein
   the image forming unit is configured to form the image on the recording material by transferring a toner image formed on an image carrier to the recording material, and fixing the toner image transferred to the recording material on the recording material,
   the image forming apparatus further includes a second detection unit configured to detect a density of the toner image formed on the image carrier, and
   the control unit is further configured to, in the first calibration, form a third test pattern on the image carrier at the first image forming speed using the first conversion condition by controlling the image forming unit, determine a target value of a detected density of the third test pattern at the second image forming speed based on a detection result of the third test pattern formed at the first image forming speed by the second detection unit, form the third test pattern on the image carrier at the second image forming speed by controlling the image forming unit, and generate the second conversion condition based on a detection result of the third test pattern formed at the second image forming speed by the second detection unit, and on the target value of the detected density of the third test pattern at the second image forming speed.

6. The image forming apparatus according to claim 5, wherein
   the control unit is further configured to determine a density of the third test pattern formed at the first image forming speed detected by the second detection unit as the target value of the detected density of the third test pattern at the second image forming speed.

7. The image forming apparatus according to claim 5, wherein
   the control unit is further configured to determine the target value of the detected density of the third test pattern at the second image forming speed by adjusting, based on a coefficient, a density of the third test pattern formed at the first image forming speed detected by the second detection unit.

8. The image forming apparatus according to claim 7, wherein
   the coefficient is decided on based on at least one of a temperature and a humidity measured by the image forming apparatus.

* * * * *